United States Patent
Capito

(10) Patent No.: US 9,416,876 B2
(45) Date of Patent: Aug. 16, 2016

(54) SYSTEM AND METHOD FOR USING ALL WHEEL DRIVE COUPLING TO ENHANCE ELECTRONIC PARKING BRAKE FUNCTION ON A MOTOR VEHICLE

(71) Applicant: American Axle & Manufacturing, Inc., Detroit, MI (US)

(72) Inventor: Russell T. Capito, Shelby Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 89 days.

(21) Appl. No.: 14/517,125

(22) Filed: Oct. 17, 2014

(65) Prior Publication Data

US 2016/0109024 A1    Apr. 21, 2016

(51) Int. Cl.
| | |
|---|---|
| B60K 17/346 | (2006.01) |
| B60K 23/08 | (2006.01) |
| B60K 6/52 | (2007.10) |
| B60T 8/32 | (2006.01) |
| B60T 8/1766 | (2006.01) |
| B60T 8/1769 | (2006.01) |
| F16H 63/48 | (2006.01) |
| B60T 8/17 | (2006.01) |
| B60T 8/24 | (2006.01) |

(52) U.S. Cl.
CPC .......... *F16H 63/486* (2013.01); *B60K 23/0808* (2013.01); *B60T 8/1701* (2013.01); *B60T 8/245* (2013.01)

(58) Field of Classification Search
CPC .. B60K 17/3462; B60K 23/0808; B60K 6/52; B60T 8/1766; B60T 8/1769; B60T 8/322
See application file for complete search history.

(56) References Cited

U.S. PATENT DOCUMENTS

| | | | | |
|---|---|---|---|---|
| 7,328,955 | B2* | 2/2008 | Tsukasaki | B60T 13/74 180/244 |
| 8,083,041 | B2 | 12/2011 | Capito et al. | |
| 2004/0064233 | A1* | 4/2004 | Iida | B60K 23/0808 701/69 |
| 2005/0109550 | A1* | 5/2005 | Buglione | B60K 6/26 180/65.25 |

* cited by examiner

*Primary Examiner* — Tisha Lewis
(74) *Attorney, Agent, or Firm* — Harness, Dickey & Pierce, P.L.C.

(57) ABSTRACT

A system and method is disclosed for applying a counter torque to at least one axle of a motor vehicle, wherein the motor vehicle has an electronic parking brake (EPB) subsystem, to thus enhance a braking action of the vehicle while the EPB subsystem is engaged. In one embodiment the system may have an all wheel drive (AWD) system configured to process electronic information received by the AWD system that informs the AWD system that the EPB subsystem has been engaged, and to then apply a counter torque to the at least one axle of the vehicle. The system may also at least one of release the counter torque after receiving electronic information informing the AWD system that the EPB subsystem has been disengaged, or return to a torque value required for AWD system operation.

19 Claims, 4 Drawing Sheets

SYSTEM AND METHOD FOR USING ALL WHEEL DRIVE COUPLING TO ENHANCE ELECTRONIC PARKING BRAKE FUNCTION ON A MOTOR VEHICLE

FIELD

The present disclosure relates to electronic parking brake systems used on motor vehicles such as cars and light trucks, and more particularly to a system and method for integrating the use of an all wheel drive coupling system with an electronic parking brake to significantly enhance the braking ability of the vehicle when the electronic parking brake is engaged.

BACKGROUND

The statements in this section merely provide background information related to the present disclosure and may not constitute prior art.

Electronic parking brakes are now commonly employed on various motor vehicles such as cars and light trucks. Typically the electronic parking brake activates the brakes on the rear wheels of the vehicle when it is engaged. Some present day vehicles use the electronic parking brake to assist the driver of the vehicle during hill-start situations. With a hill-start situation, the hydraulic brakes of the vehicle may be programmed to remain active for a calibratable amount of time, and then the electronic parking brake may be automatically engaged to provide additional braking action during the hill-start maneuver.

The effectiveness of the electronic parking brake in either hill-start situations or in simply holding the vehicle stationary while the vehicle is parked, can be somewhat reduced when the vehicle is parked on a hill with a moderate or steep grade or the rear axle is located on a lower friction surface (ex: gravel, snow, ice). This is particularly so if the vehicle is orientated on a decline, that is with the front axles of the vehicle at an elevation which is lower than the rear end of the vehicle. In this instance the weight of the vehicle may biased significantly toward the front end of the vehicle, and thus well less than 50% of the vehicle's weight may be present on the rear wheels of the vehicle. As a result, the electronic parking brake, which is engaging the brakes on the rear wheels, may be limited in effectiveness due to the reduced weight that the tires at the rear end of the vehicle are experiencing. In this example, if the vehicle has an all wheel drive ("AWD") system, there ordinarily would not be any counteracting torque applied to the front axles of the vehicle while the electronic parking brake is engaged. But being able to use the vehicle's AWD system to apply a counteracting torque to the front axles of the vehicle would significantly enhance the ability to hold the vehicle stationary, especially when the vehicle is parked on a decline with its front end lower than its rear end or the rear wheels are located on a lower friction surface (ex: gravel, snow, ice). The use of the vehicle's AWD system to apply a counteracting torque to the front axles (or possibly to all axles) of the vehicle during an emergency braking operating could also be highly beneficial in augmenting the vehicle's electronic parking brake's antilock braking function in bringing the vehicle to a rapid and controlled stop.

SUMMARY

In one aspect the present disclosure relates to a system for applying a counter torque to at least one axle of a motor vehicle, wherein the motor vehicle includes an electronic parking brake (EPB) subsystem, to enhance a braking action of the vehicle while the EPB subsystem is engaged. The system may comprise an all wheel drive (AWD) system which is configured to perform a plurality of operations. The AWD system may process electronic information received by the AWD system that informs the AWD system that the EPB subsystem has been engaged. The AWD system may then apply a counter torque to the at least one axle of the vehicle. The AWD system may also release the counter torque after receiving electronic information informing the AWD system that the EPB subsystem has been disengaged.

In another aspect the present disclosure relates to a system for applying a counter torque to at least one axle of a motor vehicle, wherein the motor vehicle includes an electronic parking brake (EPB) subsystem, to enhance a braking action of the vehicle while the EPB subsystem is engaged. The system may comprise an all wheel drive (AWD) system including a controller and software. The AWD system may be configured to perform a plurality of operations including communicating over a communications bus of the vehicle with the EPB subsystem, and receiving information over the communications bus. The received information may indicate when the EPB subsystem has been engaged. The AWD may act to apply a counter torque to the at least one axle of the vehicle to augment a braking action being applied by the EPB subsystem. The AWD may release the counter torque after receiving additional information over the communications bus informing the AWD system that the EPB subsystem has been disengaged. In one embodiment the AWD System may be configured so that it receives a single or combination of signals from another vehicle control module, such as the EPB or Electronic Stability Control System, which commands the AWD System clutch torque to a torque value when the EPB System is active. Once the vehicle's control module is no longer commanding the AWD system to a torque value, the AWD system's clutch torque returns to a torque value commanded by the AWD System.

In still another aspect the present disclosure relates to a method for applying a counter torque to at least one axle of a motor vehicle, wherein the motor vehicle includes an electronic parking brake (EPB) subsystem, to enhance a braking action of the vehicle while the EPB subsystem is engaged. The method may comprise using an all wheel drive (AWD) system to process electronic information received by the AWD system. The electronic information may inform the AWD system that the EPB subsystem has been engaged. The AWD system may apply a counter torque to the at least one axle of the vehicle. The AWD may also release the counter torque after receiving electronic information informing the AWD system that the EPB subsystem has been disengaged.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
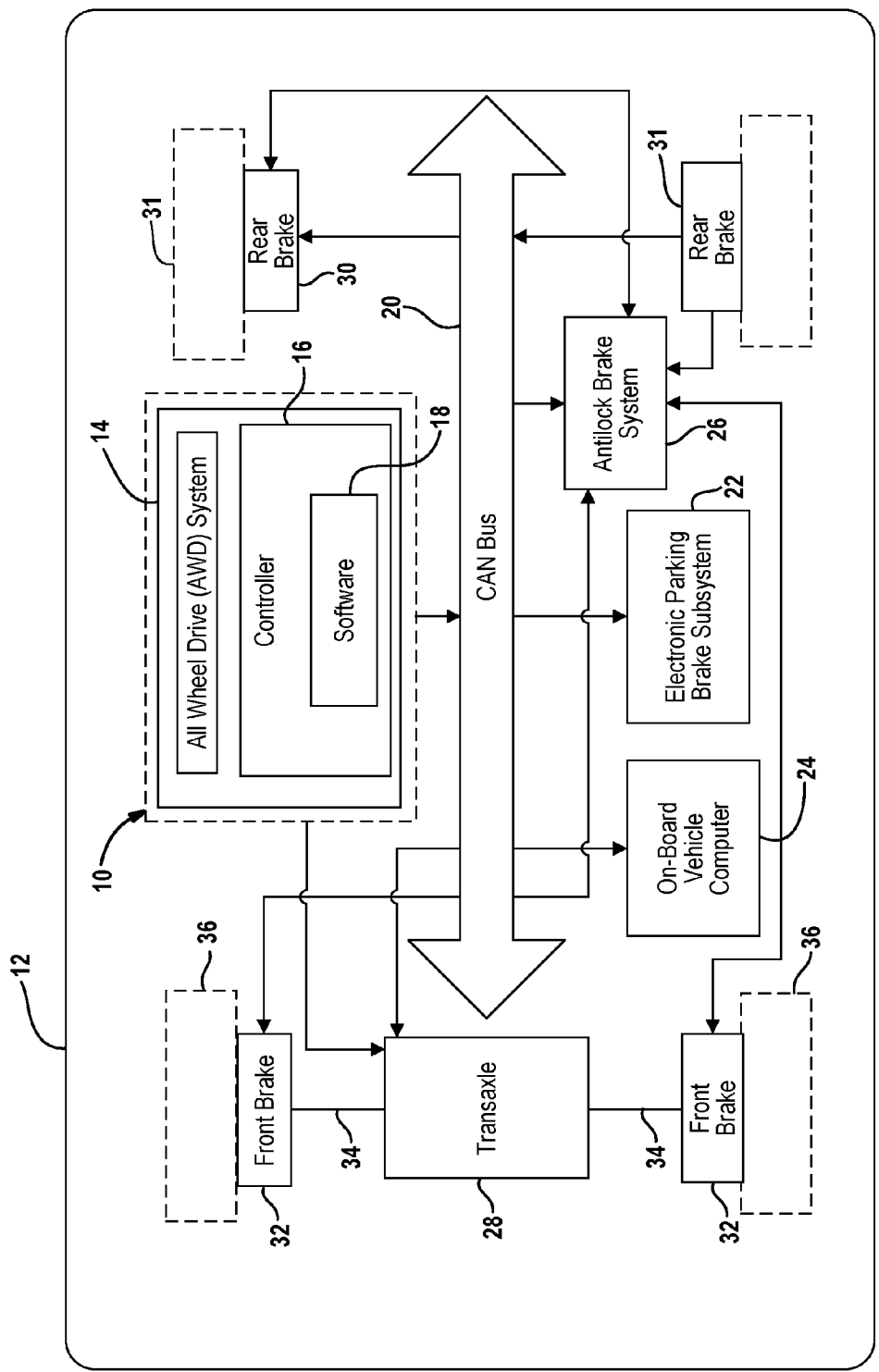
FIG. 1 is a high level block diagram illustrating one example of an embodiment the present disclosure integrated in a motor vehicle to communicate on the vehicle's CAN bus with other subsystems of the vehicle, to control the application of a counter torque to the front axles of the vehicle during predetermined braking conditions.

The following description is merely exemplary in nature and is not intended to limit the present disclosure, application, or uses. It should be understood that throughout the drawings, corresponding reference numerals indicate like or corresponding parts and features.

In FIG. 1 a system 10 in accordance with one embodiment of the present disclosure is shown integrated into a motor vehicle 12. The motor vehicle 12 may be any type of motor vehicle, but the system 10 is expected to find particularly utility on passenger cars and light trucks. The system 10 may also find utility on all-terrain vehicles ("ATVs"). A 4×4 ATV could be a potential application, as well as virtually any vehicle that makes use of a transfer case (e.g., a pick-up truck). As such, it will be appreciated that the system 10 is not limited to use with any one particular type or style of motor vehicle.

The system 10 may include an all wheel drive ("AWD") system 14 having a controller 16 with software 18. The AWD system 14 may communicate over a communications bus 20 of the vehicle 12 to receive and/or send electronic messages, commands or status information, or other types of information in the form of electronic messages. In this example the communications bus is a controller area network ("CAN") bus, although it will be understood that the system 10 may make use of virtually any type of communications bus that permits status electronic messages, commands, status information, or any other type of electronic information to be relayed between the various subsystems of the vehicle 12 in real time. Simply for convenience, the communications bus 20 will be referred to throughout the following discussion as "CAN bus" 20.

The AWD system 14 may communicate over the CAN bus 20 with a wide range of electronic and electromechanical subsystems of the vehicle 12, for example an electronic parking brake ("EPB") subsystem 22, an on-board vehicle computer 24, an antilock braking system ("ABS") 26, and a transaxle 28. The ABS 26 may control the braking force applied by rear brakes 30 and front brakes 32.

It is a principal advantage of the system 10 that the AWD system 14, and particularly the controller 16 thereof, is able to monitor the CAN bus 20 and determine when the EPB subsystem 22 is engaging the rear brakes 30. The EPB subsystem 22 is typically deployed by the user of the vehicle engaging a parking brake lever or switch inside the vehicle. This action is detected by the EPB subsystem 22, and in response, the EPB subsystem causes engagement of the rear brakes 30. Typically, the EPB subsystem 22 is used to apply a braking force to the rear wheels 31 of the vehicle in situations where an additional braking force is desired, such as when the vehicle is parked on an incline or decline or if the conventional hydraulic brakes have failed. As noted above, when the vehicle 12 is parked on a decline (i.e., front wheels at lower elevation than rear wheels), the weight that the rear wheels of the vehicle will be experiencing may be significantly reduced or the rear wheels are located on a lower friction surface (e.g., gravel, snow, ice). This will depend in large part on the severity of the angle of decline. In such instances the front wheels of the vehicle 12 may be experiencing significantly added weight (e.g., well more than 50% of the vehicle's total curb weight), which may make performing braking using the front brakes 32 significantly more advantageous than using the rear brakes 30.

The system 10 takes advantage of this condition by using the controller 16 and its associated software 18 to first detect when the EPB subsystem 22 is active. This detection may be accomplished by the controller 16 recognizing a signal or command that has been transmitted on the CAN bus 20 by the EPB subsystem 22. The controller 16 may control or command the AWD system 14 to signal the transaxle 28 to apply a counter torque to a pair of front axles 34 associated with the transaxle 28. The counter torque applied to the front axles 34 is a torque that counteracts the torque being experienced by the front axles 34 as a result of the vehicle being on a decline. The counter torque acts as a braking force, applied by the front axles 34, on the front wheels 36 of the vehicle 12. This, coupled with the added weight being experienced by the front wheels 36 as a result of the vehicle 12 being on a decline, provides a potential braking force to the front wheels 36. Thus, a braking force may be applied to the front wheels 36 by the AWD system 14 while a braking force is applied to the rear wheels 31 by the EPB subsystem 22. The braking force applied to the front wheels 36 by using the AWD system 14 may be especially helpful if the vehicle is parked on a slight grade (i.e., slight decline), where the rear wheels are on a low friction surface (e.g., snow) and the front wheels are on a high friction surface (e.g., dry pavement).

It will be appreciated that the system 10 could be modified so that the on-board vehicle computer 24 recognizes a message or command on the CAN bus that the EPB subsystem 22 is being engaged to brake the rear wheels 31, or alternatively if the on-board computer 24 or the ABS 26 determines that the EPB subsystem 22 should be applied. In either instance, the on-board vehicle computer 24 may command the AWD system 14 to apply the counter torque to the front axles 34. Put differently, the sensing action which determines the need for the AWD system 14 to generate the counter torque can be performed either by the AWD system 14 itself, as depicted in FIG. 1 and described in detail above, or by the on-board vehicle computer 24, or potentially by some other sensing device/subsystem.

The system 10 may also be configured to apply a counter torque to the front axles 34 and/or rear axles 38 (see FIG. 1) of the vehicle 12 in real time during an emergency braking situation, or possibly if a condition is detected in which the front brakes 32 or rear brakes 30 fail while the vehicle 12 is moving. By applying a counter torque while some limited braking of the vehicle 12 is taking place, this action may augment the action of the ABS 26 and thus potentially help to bring the vehicle 12 to a controlled stop.

Still another potential application of the teachings of the present disclosure may be in connection with aiding the driver during hill-start situations. At the present time some vehicle manufacturers provide a feature that allows the driver to remove his/her foot from the brake pedal and have the vehicle remain stationary for a limited, calibratable amount of time. This can be helpful in allowing the driver to better begin transitioning the vehicle from a parked condition up to a cruising speed when the vehicle begins moving up or down a hill. This function may be implemented by having the hydraulic brakes active for a calibratable amount of time, and then having the vehicle's EPB system engage to keep the vehicle stationary. This "brake-hold" function could be enhanced by using the system 10 so that the vehicle's AWD system applies a counter torque to the front axles when the EPB is active. This would allow for the potential transfer of the EPB torque to the front axles, depending on conditions. This feature would allow the driver to transition his/her foot from the brake pedal to the throttle pedal, without vehicle roll-back. In the case of a manual transmission vehicle, this would allow the driver to remove his/her foot from the brake pedal to use the vehicle's clutch and throttle pedal without vehicle roll-back.

Figure 2:
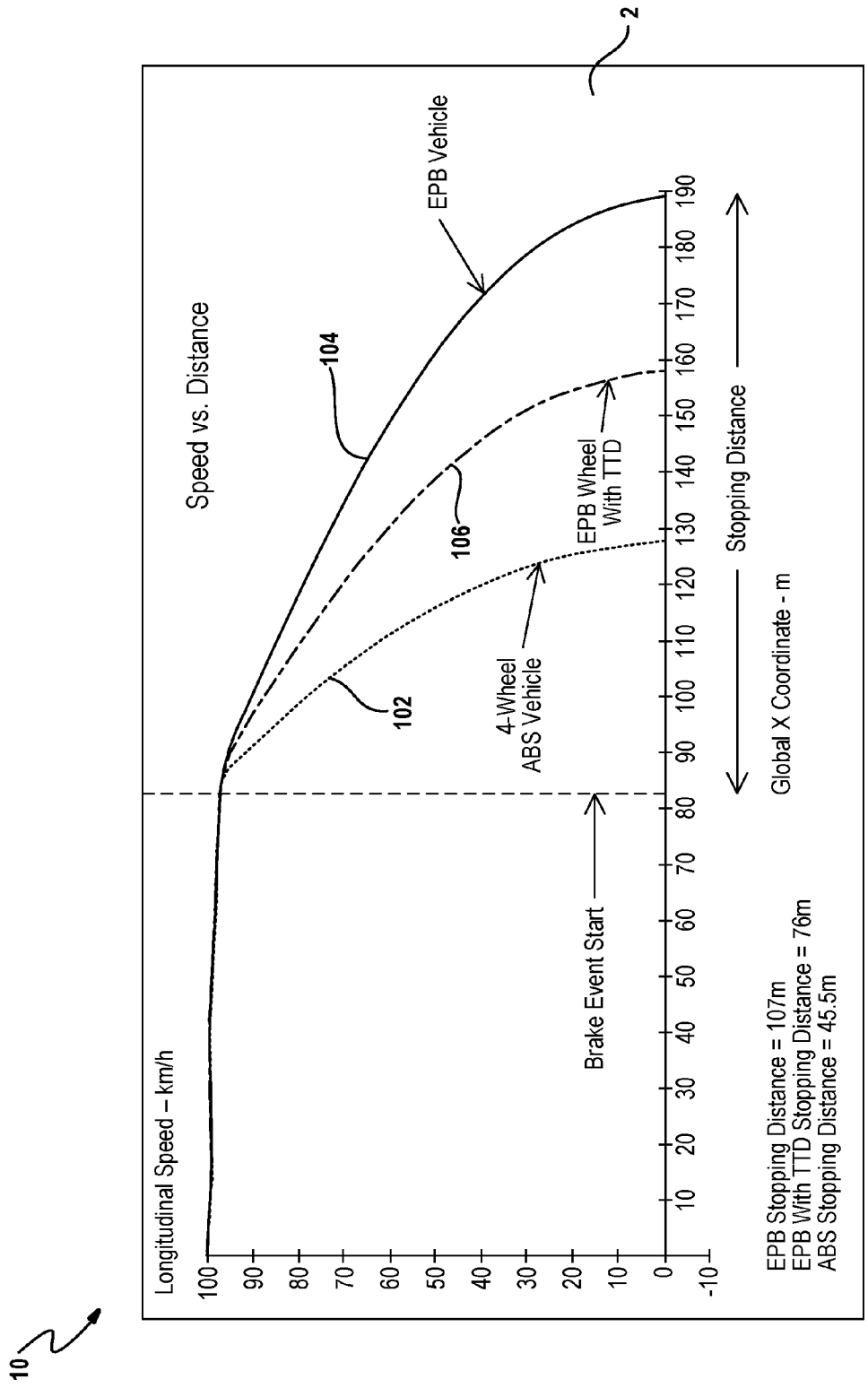
FIG. 2 is a graph of estimated stopping distances for stopping a vehicle using just the vehicle's ABS system, just the vehicle's EPB system, and a combination of the vehicle's EPB system and the system of the present disclosure.

With brief reference to FIG. 2, a graph 100 is shown to illustrate the potential braking enhancement that may be achieved using the system 10 when initiating a braking event at various speeds. The curves 102, 104 and 106 shown on the graph 100 were generated using CARSIM® mechanical dynamic simulation software which is available from Mechanical Simulation Corporation of Ann Arbor, Mich. Curve 102 illustrates the stopping distance for a 4Wheel ABS equipped vehicle. Curve 104 illustrates the stopping distance using just the vehicle's EPB system, and curve 106 illustrates the stopping distance using both the vehicle's EPB system and the system 10 of the present disclosure. In this simulation, the stopping distance has been reduced by more than 30 meters, which is a significant reduction in stopping distance.

Figure 3:
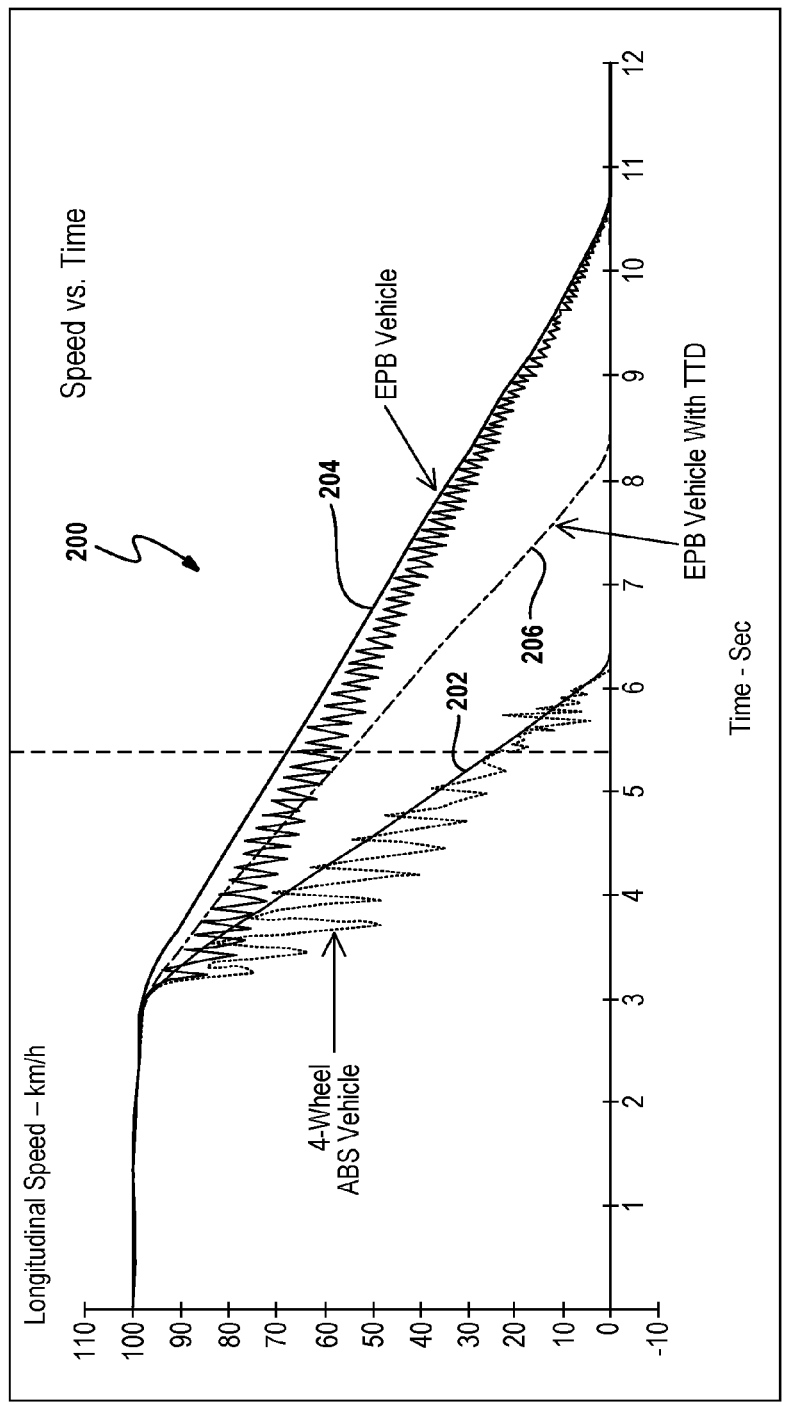
FIG. 3 is a graph of estimated times for stopping a vehicle using just the vehicle's ABS system, just the vehicle's EPB system, and a combination of the vehicle's EPB system and the system of the present disclosure.

Referring to FIG. 3, a graph 200 is shown which illustrates curves 202, 204 and 206 to illustrate an estimated reduction in braking time (in seconds) to bring a vehicle to a dead stop after a braking event is initiated. Curve 202 represents the estimated braking time using only the vehicle's 4Wheel ABS system. Curve 204 represents the estimated braking time using the vehicle's EPB system, and curve 206 represents the estimated braking time when using both the vehicle's EPB system and the system 10 of the present disclosure. Again, a significant time reduction is experienced (about 5 seconds) when the system 10 is used to help brake the vehicle.

Figure 4:
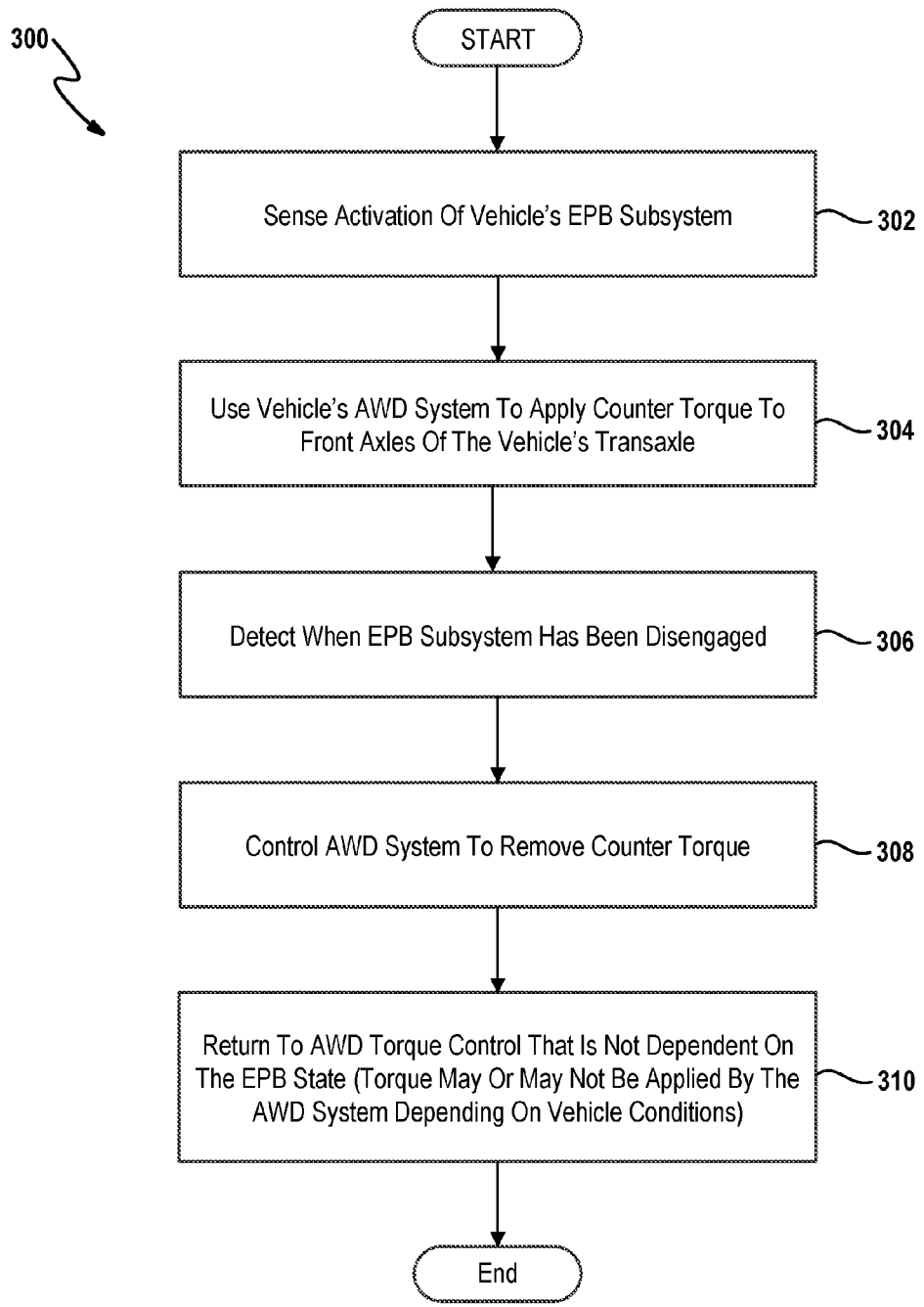
FIG. 4 is a high level flowchart of various operations that may be performed by the system of FIG. 1.

FIG. 4 shows a flowchart 300 to illustrate one example of various operations that may be performed by the system 10. At operation 302 sensing for activation of the vehicle's EPB subsystem 22 is performed. This may be performed in any suitable manner, for example by sensing for appropriate signals transmitted on the vehicle's CAN bus 20 from the EPB subsystem 22. Sensing may be performed by the AWD system 14, the on-board vehicle computer 24 or a different subsystem.

At operation 304 the vehicle's AWD system 14 is controlled to apply a counter torque to the front axles 34 of the vehicle's transaxle 28. At operation 306 disengagement of the EPB subsystem 22 is detected. Again, this detection may be accomplished by the AWD system 14, or possibly by the on-board vehicle computer 24 or by different subsystem of the vehicle 12. At operation 308 the AWD system 14 is controlled to remove the counter torque. At operation 310, torque control may be returned to the AWD system 14 that is not dependent on the EPB state (i.e., torque control may or may not be applied by the AWD system 14 depending on vehicle conditions). Again, it will be appreciated that the sensing actions, as well as the activation and removal of the counter torque, are carried out in real time.

The present system 10 and methodology of operation described herein thus enables an AWD system to be used to apply a counter torque to the axles of a vehicle to enhance a braking action on the vehicle's wheels when the EPB subsystem of the vehicle is activated. While the various embodiments have been described in connection with applying a counter torque to the front axles of a transaxle, it will be appreciated that the present disclosure could readily be implemented such that the AWD system applies a counter torque to all four axles of a vehicle (i.e., both pairs of front and rear axles), or possibly to either just the front axles or just the rear axles, depending on specific conditions. The system 10 of the present disclosure could also be configured such that the AWD system 14 applies a ramped up counter torque, or a modulated counter torque, or possibly even both, to best meet the needs of a particular driving situation.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for applying a counter torque to at least one axle of a motor vehicle, wherein the motor vehicle includes an electronic parking brake (EPB) subsystem, to enhance a braking action of the vehicle while the EPB subsystem is engaged, the system comprising:
    an all wheel drive (AWD) system configured to:
        process electronic information received by the AWD system that informs the AWD system that the EPB subsystem has been engaged;
        apply a counter torque to the at least one axle of the vehicle; and
        to at least one of release the counter torque, or return to a torque value required for AWD system operation, after receiving electronic information informing the AWD system that the EPB subsystem has been disengaged.

2. The system of claim 1, wherein the AWD system includes a controller and software for communicating with at least one other subsystem of the vehicle.

3. The system of claim 1, wherein the AWD system communicates with the at least one other subsystem of the vehicle over a communications bus on the vehicle.

4. The system of claim 1, wherein the at least one other subsystem is the EPB subsystem.

5. The system of claim 4, wherein the electronic information received by the AWD system is a message from the EPB subsystem.

6. The system of claim 5, wherein the message is transmitted over a bus.

7. The system of claim 6, wherein the bus comprises a controller area network (CAN) bus.

8. The system of claim 1, wherein the AWD system communicates with the at least one other subsystem via a communications bus on the vehicle, and where the communications include electronic messages transmitted over the bus.

9. The system of claim 8, wherein the communications bus is a controller area network (CAN) bus.

10. The system of claim 1, wherein the information is processed and acted on by the AWD system in real time.

11. A system for applying a counter torque to at least one axle of a motor vehicle, wherein the motor vehicle includes an electronic parking brake (EPB) subsystem, to enhance a braking action of the vehicle while the EPB subsystem is engaged, the system comprising:
    an all wheel drive (AWD) system including a controller and software, the AWD system configured to:
    communicate over a communications bus of the vehicle with the EPB subsystem;
    to receive information over the communications bus indicating when the EPB subsystem has been engaged;

to apply a counter torque to the at least one axle of the vehicle to augment a braking action being applied by the EPB subsystem; and to release the counter torque after receiving additional information over the communications bus informing the AWD system that the EPB subsystem has been disengaged.

12. The system of claim 11, wherein the information comprises at least one of a message, a command or a status.

13. The system of claim 11, wherein the AWD system is configured to communicate over a controller area network (CAN) bus.

14. The system of claim 11, wherein the information is received and processed by the AWD system, and the application of the counter torque is applied in real time.

15. A method for applying a counter torque to at least one axle of a motor vehicle, wherein the motor vehicle includes an electronic parking brake (EPB) subsystem, to enhance a braking action of the vehicle while the EPB subsystem is engaged, the method comprising:

using an all wheel drive (AWD) system to:

process electronic information received by the AWD system that informs the AWD system that the EPB subsystem has been engaged;

applying a counter torque to the at least one axle of the vehicle; and releasing the counter torque after receiving electronic information informing the AWD system that the EPB subsystem has been disengaged.

16. The method of claim 15, wherein the electronic information is received by the AWD over a communications bus of the vehicle.

17. The method of claim 16, wherein the communications bus comprises a controller area network (CAN) bus.

18. The method of claim 16, wherein the electronic information received by the AWD system is processed and the counter torque generated in real time.

19. The method of claim 16, wherein the operation of releasing the counter torque after receiving electronic information is performed in real time.

* * * * *